(12) United States Patent
Illustrato

(10) Patent No.: US 8,371,401 B1
(45) Date of Patent: Feb. 12, 2013

(54) ELECTRIC POWER HYBRID PROPULSION GENERATION SYSTEM FOR A MOTOR VEHICLE

(76) Inventor: Vito J. Illustrato, Pelham Manor, NY (US)

( * ) Notice: Subject to any disclaimer, the term of this patent is extended or adjusted under 35 U.S.C. 154(b) by 227 days.

(21) Appl. No.: 12/925,897

(22) Filed: Nov. 1, 2010

(51) Int. Cl.
*B60L 8/00* (2006.01)
*B60K 16/00* (2006.01)

(52) U.S. Cl. ........................................ 180/2.2

(58) Field of Classification Search ............... 180/2.1, 180/2.2
See application file for complete search history.

(56) References Cited

U.S. PATENT DOCUMENTS

| | | | |
|---|---|---|---|
| 4,168,759 A * | 9/1979 | Hull et al. ................ | 180/2.2 |
| 4,178,126 A | 12/1979 | Weed | |
| 4,237,384 A | 12/1980 | Kennon | |
| 4,314,160 A | 2/1982 | Boodman et al. | |
| 5,280,827 A * | 1/1994 | Taylor et al. ............. | 180/165 |
| 5,920,127 A | 7/1999 | Damron et al. | |
| 6,838,782 B2 | 1/2005 | Vu | |
| 6,877,948 B2 | 4/2005 | Cutcher | |
| 7,105,940 B2 | 9/2006 | Weesner et al. | |
| 7,216,943 B2 * | 5/2007 | Nishikawa et al. ...... | 303/152 |

* cited by examiner

*Primary Examiner* — Jeffrey J Restifo
*Assistant Examiner* — Erez Gurari
(74) *Attorney, Agent, or Firm* — Richard L. Miller

(57) ABSTRACT

An electric power hybrid propulsion generation system for a motor vehicle which comprises a wind turbine rotatively mounted on a roof of the motor vehicle. Two independent electric generators are in the motor vehicle. Two drive belt assemblies extend between the wind turbine and the electric generators. An auxiliary battery array in the motor vehicle is electrically connected to the electric generators. An electric motor drive in the motor vehicle is powered by the auxiliary battery array to operate rear wheels of the motor vehicle independently from a fuel engine and transmission of the motor vehicle, which operates front wheels of the motor vehicle.

6 Claims, 5 Drawing Sheets

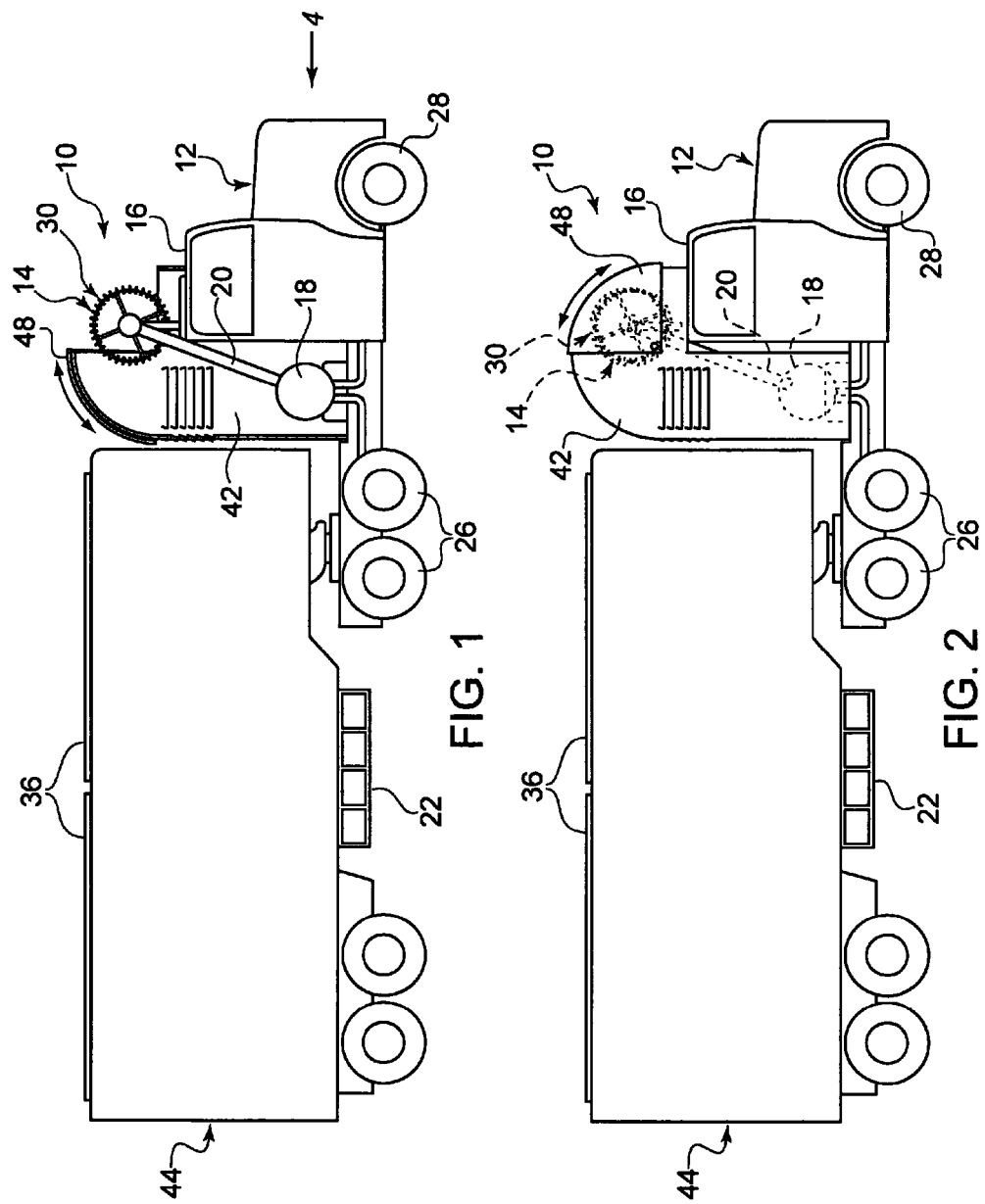

ELECTRIC POWER HYBRID PROPULSION GENERATION SYSTEM FOR A MOTOR VEHICLE

BACKGROUND OF THE INVENTION

1. Field of the Invention

The present invention relates to a wind energy device, and more particularly, an electric power hybrid propulsion generation system for a motor vehicle.

2. Description of the Prior Art

Numerous innovations for wind energy capturing devices have been provided in the prior art that will be described. Even though these innovations may be suitable for the specific individual purposes to which they address, however, they differ from the present invention.

A FIRST EXAMPLE, U.S. Pat. No. 4,178,126, Issued on Dec. 1, 1979, to Weed teaches a journaled rotor for rotation about an axis to be disposed transverse to a fluid flow path and the rotor includes a plurality of mounting portions spaced radially outwardly from and circumferentially about the axis having a plurality of vane assemblies rotatably mounted therefrom for angular displacement about axis generally paralleling the axis of rotation of the rotor. Vane assembly displacement control structure is operatively connected to the vane assemblies for angularly displacing the vane assemblies relative to the corresponding mounting portions 180 degrees each 360 degrees of angular displacement of the rotor and in directions opposite the direction of angular displacement of the rotor upon rotation of the latter. The vane assemblies are variously optimumly angularly positioned relative to the corresponding mounting portions and each other to effect substantially maximum thrust therefrom on the rotor as a result of fluid flow there against from one side of the axis of rotation of the rotor. The vane assembly displacement control structure includes an adjustment feature operative to effect simultaneous adjusted angular displacement of the vane assemblies relative to the corresponding mounting portions independent of rotation of the rotor and the adjustment feature includes fluid flow direction sensing structure operative to sense changes in the direction of fluid flow toward the axis of rotation of the rotor and to accordingly variously angularly position the vane assemblies about their axes of rotation relative to the mounting portions in order to maintain the optimumly angularly displaced positions thereof relative to the changed fluid flow direction. One disclosed form of the invention includes a control for the adjustment feature whereby the vane assemblies may be manually variously angularly positioned relative to the corresponding mounting portions of the rotor toward positions displaced relative to the direction of fluid flow against the rotor whereby the vane assemblies will be inoperative to drive the rotor. Further, a second form of the invention includes structure whereby the vane assemblies each comprise a plurality of vanes which may be remotely feathered toward positions parallel to the fluid flow acting upon the rotor.

A SECOND EXAMPLE, U.S. Pat. No. 4,237,384, Issued on Dec. 2, 1980, to Kennon teaches a turbine wheel which includes a housing for enclosing the electrical generating apparatus, and track structure which engages and rotatably drives the generator or the like, i.e., through suitable coupling structure. Shroud structure is disposed in an operable exterior proximity with the turbine wheel for varying the effectiveness of the wind as it is acting upon the turbine wheel, i.e., in infinite variable stages commensurate with changing velocity of the wind. The speed of the turbine wheel is automatically controlled so as to remain substantially constant throughout a wide variance of normal wind velocity and irrespective of the direction of the wind.

A THIRD EXAMPLE, U.S. Pat. No. 4,314,160, Issued on Feb. 1, 1982, to Boodman et al. teaches a means to provide additional electrical power in an electrically powered vehicle. An air scoop is mounted on the vehicle. The air scoop opens in a generally forward direction. A turbine wheel is mounted in the rear of the air scoop. An electric generator is connected to the turbine wheel, whereby air passing through the air scoop will generate additional electricity for the vehicle batteries. The air scoop is rotatable and means are provided to lock it in position.

A FOURTH EXAMPLE, U.S. Pat. No. 5,920,127, Issued on Jul. 6, 1999, to Damron et al. teaches a multibladed (three or more) small diameter propeller as being included in an apparatus consisting of the single unenclosed propeller, extention shaft, armature shaft, and generator; such apparatus to be mounted on top of an electric vehicle to transform wind energy into electrical energy for feeding such energy into the battery pack as the vehicle is being driven forward; such energy to augment the stored voltage potential of the battery pack.

A FIFTH EXAMPLE, U.S. Pat. No. 6,838,782, Issued on Jan. 4, 2005, to Vu teaches a wind energy capturing device for moving vehicles including a wind turbine powered electrical power generator for installation on the roof of a moving vehicle such as a truck cab or tractor. The invention takes advantage of the powerful wind force generated by the vehicle moving on the road at moderate to high speed impinging against the wind deflector mounted on the truck cab or tractor. This otherwise "wasted" wind energy is captured and directed to the face area of the rotor blade, rotating the turbine, which, in turn, drives the generator to generate electricity. The electrical energy may be stored in a battery system and used to drive the motors of an electric vehicle or hybrid-electric vehicle.

A SIXTH EXAMPLE, U.S. Pat. No. 6,877,948, Issued on Apr. 12, 2005, to Cutcher teaches a wind turbine generator which includes a hub, a plurality of wind driven blades arranged around the hub, a drive belt or drive chain or other mechanical drive driven by the plurality of blades, an electric generator driven by the mechanical drive; and a boxlike frame forming a wind blocking wall for blocking wind from blowing against any of the plurality of wind driven blades in the reverse direction. In one arrangement, the wind turbine generator further includes two oil or gas tanks, and the boxlike frame is placed between the tanks to take advantage of the natural wind channeling between the two tanks. In another arrangement, the wind turbine generator further includes a house or building and the boxlike frame is built into the side of the house or building. The boxlike frame is also built into the top of a roof or the middle of a roof in other arrangements.

A SEVENTH EXAMPLE, U.S. Pat. No. 7,105,940, Issued on Sep. 12, 2006, to Weesner et al. teaches a method and apparatus for a portable renewable energy generator which includes; a movable platform adapted for one of towing and transport to a remote area, a redundant renewable energy source generator including a wind energy extraction device configured for transport on the movable platform, and a battery system operably connected to the redundant renewable energy source generator. The battery system is configured to store electrical energy generated by the redundant renewable energy source generator.

It is apparent now that numerous innovations for wind energy capturing devices have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide an electric power hybrid propulsion generation system for a motor vehicle that avoids the disadvantages of the prior art.

ANOTHER OBJECT of the present invention is to provide an electric power hybrid propulsion generation system for a motor vehicle that is simple and inexpensive to manufacture.

STILL ANOTHER OBJECT of the present invention is to provide an electric power hybrid propulsion generation system for a motor vehicle that is simple to use.

BRIEFLY STATED, STILL YET ANOTHER OBJECT of the present invention is to provide an electric power hybrid propulsion generation system for a motor vehicle which comprises a wind turbine rotatively mounted on a roof of the motor vehicle. Two independent electric generators are in the motor vehicle. Two drive belt assemblies extend between the wind turbine and the electric generators. An auxiliary battery array in the motor vehicle is electrically connected to the electric generators. An electric motor drive in the motor vehicle is powered by the auxiliary battery array to operate rear wheels of the motor vehicle independently from a fuel engine and transmission of the motor vehicle, which operates front wheels of the motor vehicle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 1 is a diagrammatic side view, with parts broken away, showing an embodiment of the present invention installed on a typical truck, with the wind diverter cover in an opened position;

FIG. 2 is a diagrammatic side view showing the present invention installed on the typical truck, with the wind diverter cover in a closed position;

A MARSHALING OF REFERENCE NUMERALS UTILIZED IN THE DRAWING

| | |
|---|---|
| 10 | generation system |
| 12 | motor vehicle |
| 14 | wind turbine of generation system 10 |
| 16 | roof of motor vehicle 12 |
| 18 | electric generator of generation system 10 |
| 20 | drive belt assembly of generation system 10 |
| 22 | battery array of generation system 10 |
| 24 | electric motor drive of generation system 10 |
| 26 | rear wheels of motor vehicle 12 |
| 28 | front wheels of motor vehicle 12 |
| 30 | squirrel cage rotor of wind turbine 14 |
| 32 | angular curved blade of squirrel cage rotor 30 |
| 34 | flat blade of squirrel cage rotor 30 |
| 36 | solar panel of generation system 10 |
| 38 | motor vehicle electronics |
| 40 | dynamic braking circuit of generation system 10 |
| 42 | vented compartment of generation system 10 |
| 44 | truck for motor vehicle 12 |
| 46 | tandem truck for motor vehicle 12 |
| 48 | wind diverter cover of generation system 10 |

DETAILED DESCRIPTION OF THE PREFERRED EMBODIMENT

Figure 7:
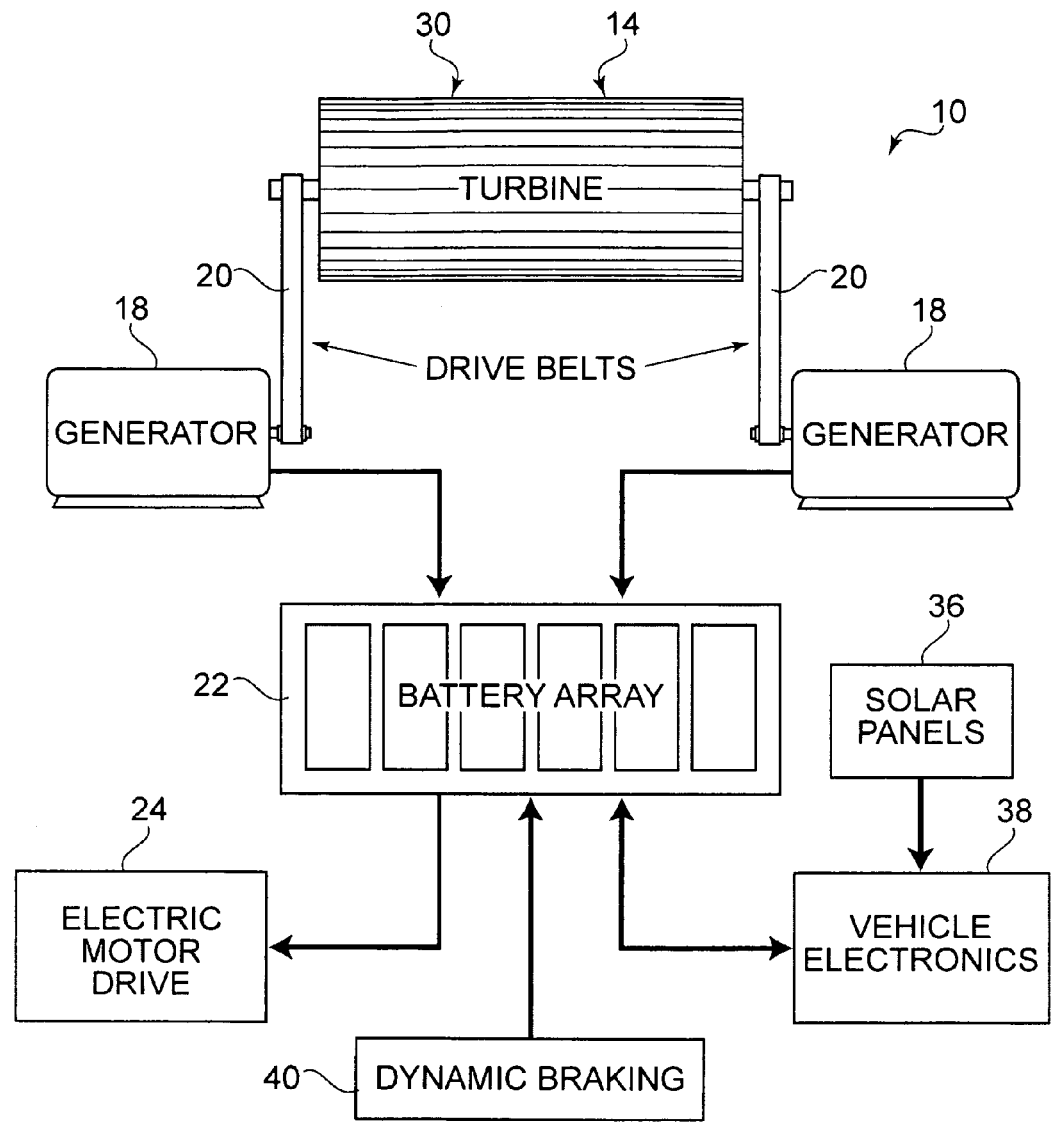
FIG. 7 is a block diagram showing the interconnection between various components of the present invention.

Referring now to the figures, in which like numerals indicate like parts, and particularly to FIGS. 1, through 7, which are a diagrammatic side view, with parts broken away, showing an embodiment of the present invention installed on a typical truck, with the wind diverter cover in an opened position; a diagrammatic side view showing the present invention installed on the typical truck, with the wind diverter cover in a closed position; a diagrammatic side view, similar to FIG. 1, showing the present invention installed on a typical tandem truck, with the wind diverter cover in the opened position; a diagrammatic front view taken in the direction of arrow 4 in FIG. 1; a diagrammatic perspective view of the squirrel cage rotor having angular curved blades; a diagrammatic perspective view of the squirrel cage rotor having flat blades; and a block diagram showing the interconnection between various components of the present invention, and as such, will be discussed with reference thereto.

The present invention is an electric power hybrid propulsion generation system 10 for a motor vehicle 12 which comprises a wind turbine 14 rotatively mounted on a roof 16 of the motor vehicle 12. Two independent electric generators 18 are in the motor vehicle 12. Two drive belt assemblies 20 extend between the wind turbine 14 and the electric generators 18. An auxiliary battery array 22 in the motor vehicle 12 is electrically connected to the electric generators 18. An electric motor drive 24 in the motor vehicle 12 is powered by the auxiliary battery array 22 to operate rear wheels 26 of the motor vehicle 12 independently from fuel engine and transmission of the motor vehicle 12, which operates front wheels 28 of the motor vehicle 12.

Figure 3:
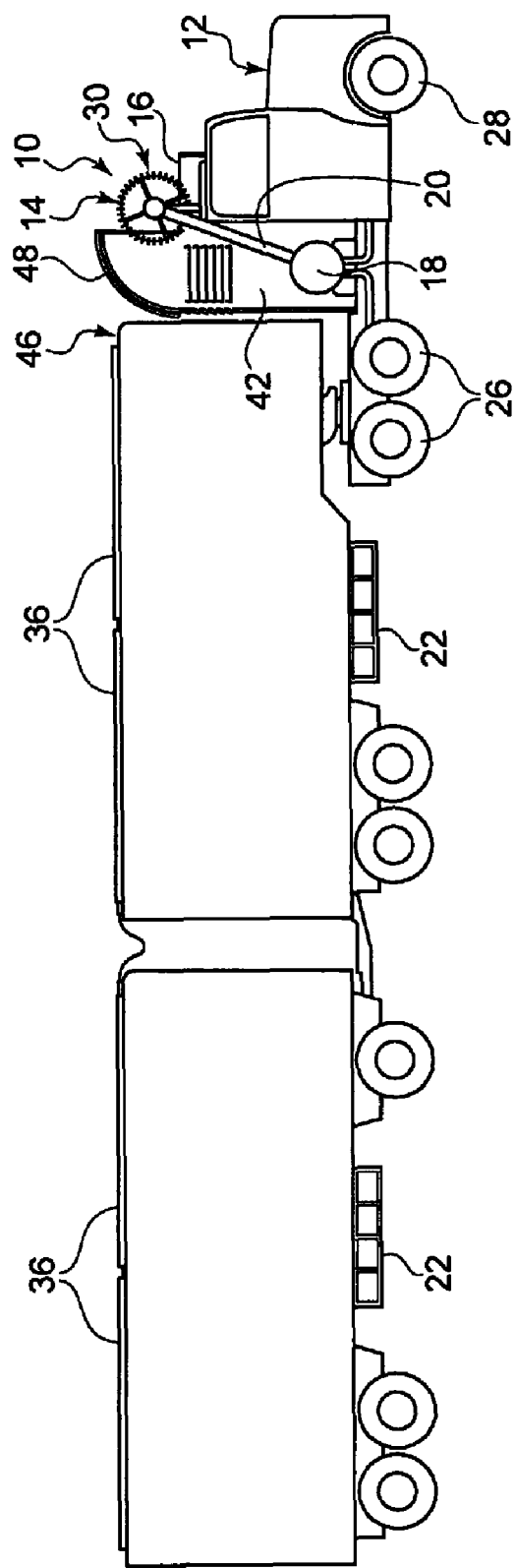
FIG. 3 is a diagrammatic side view, similar to FIG. 1, showing the present invention installed on a typical tandem truck, with the wind diverter cover in the opened position.
Figure 4:
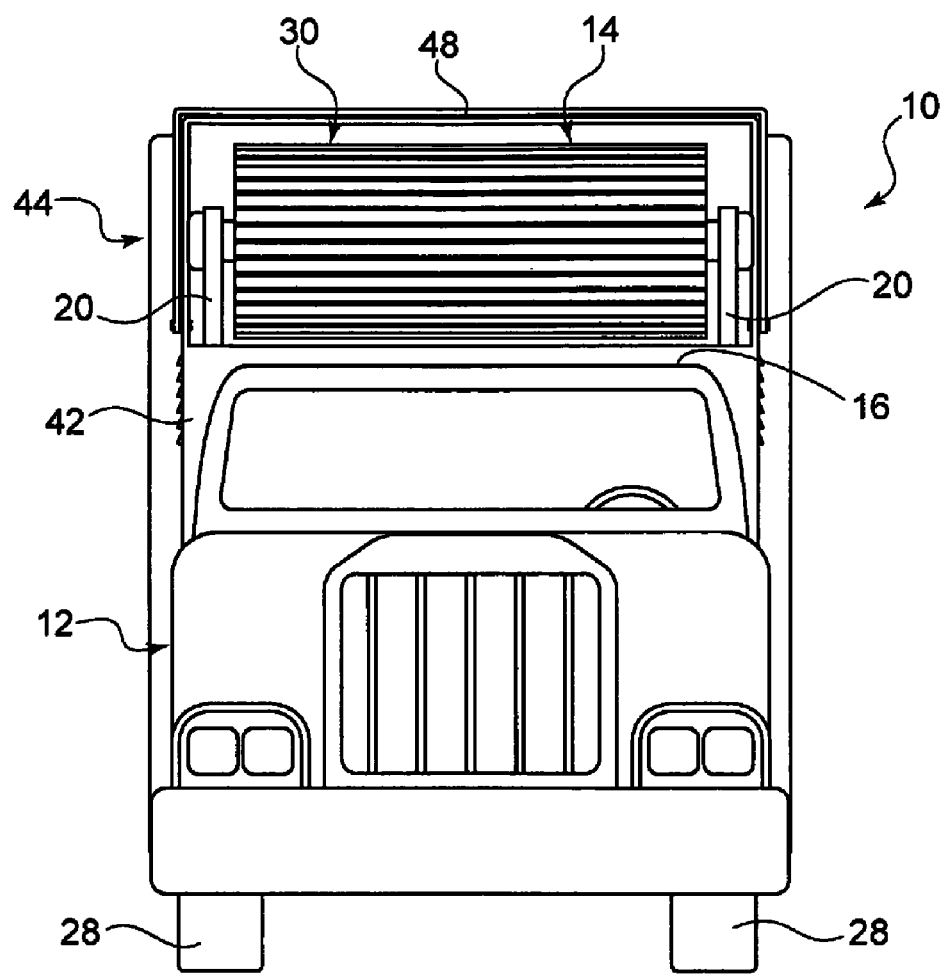
FIG. 4 is a diagrammatic front view taken in the direction of arrow 4 in FIG. 1.
Figure 5:
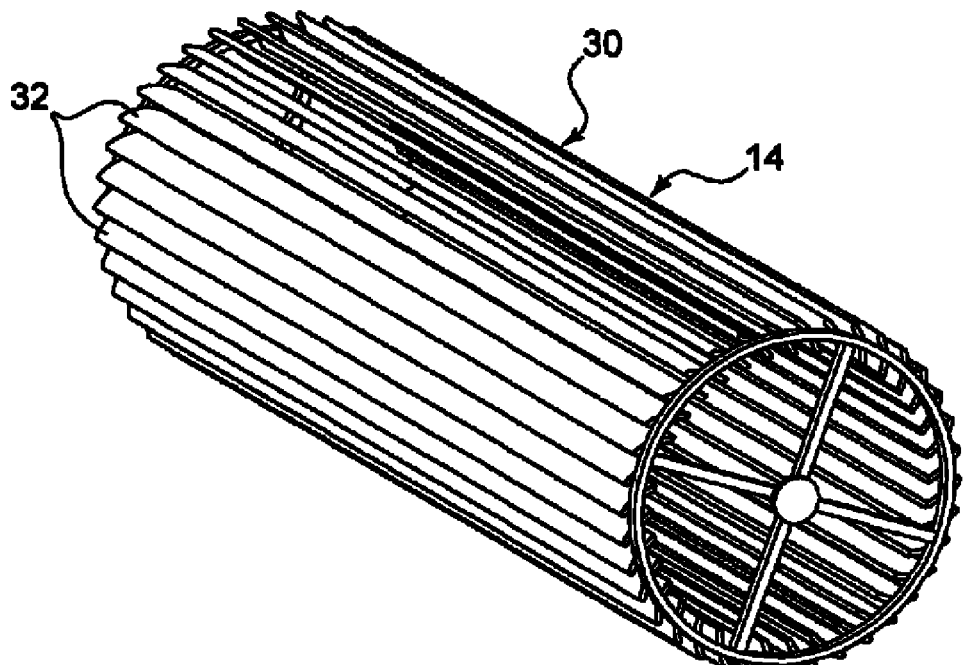
FIG. 5 is a diagrammatic perspective view of the squirrel cage rotor having angular curved blades.

The wind turbine 14 is comprised of a squirrel cage rotor 30. The squirrel cage rotor 30, as best seen in FIG. 5, comprises a plurality of angular curved blades 32 thereabout.

Figure 6:
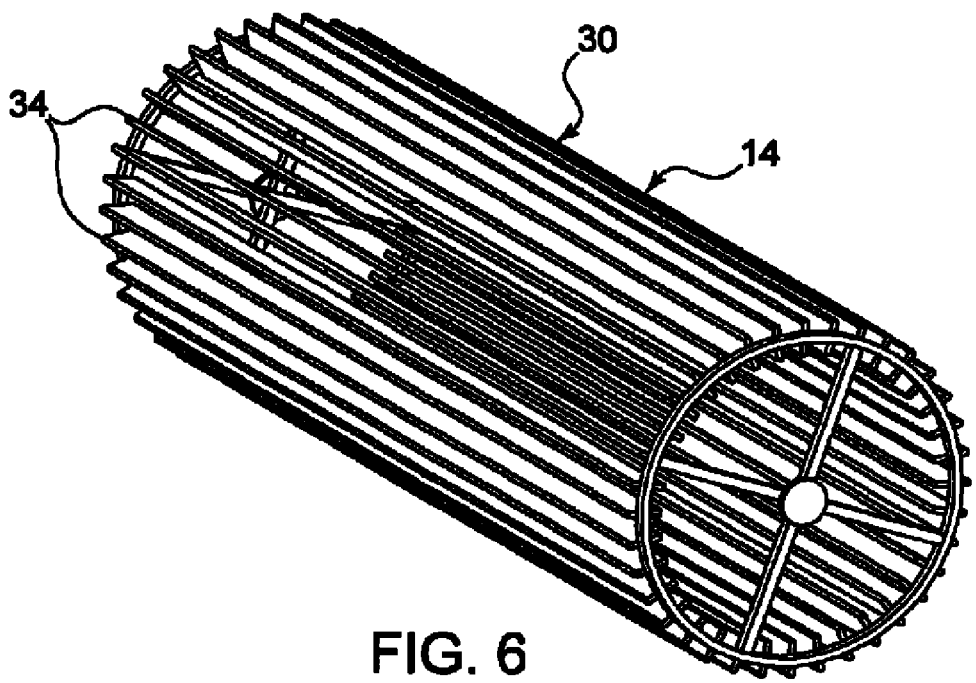
FIG. 6 is a diagrammatic perspective view of the squirrel cage rotor having flat blades.

The squirrel cage rotor 30, as best seen in FIG. 6, comprises a plurality of flat blades 34 thereabout. The use of the angular curved blades 32 or the flat blades 34 depends upon which configuration produces the greater amount of torque and speed.

The generation system 10, as best seen in FIG. 7, further comprises solar panels 36 mounted on the motor vehicle 12, which will supply additional electric power to the motor vehicle electronics 38 that are in turn electrically connected to said battery array 22. A dynamic braking circuit 40 electrically connected to the auxiliary battery array 22 supplies additional electric power to the auxiliary battery array 22 when the dynamic braking circuit 40 is activated, by a driver of the motor vehicle 12 apply the brakes.

A vented compartment 42 encloses the wind turbine 14, the electric generators 18 and the drive belt assemblies 20, when the motor vehicle 12 is a truck 44 or tandem truck 46. A wind diverter cover 48 is slideably mounted on the vented compartment 42 in front of the wind turbine 14. The wind diverter cover 48 can slide between an opened position to expose the wind turbine 14 for use and to a closed position when the wind turbine 14 is not being used.

It will be understood that each of the elements described above, or two or more together, may also find a useful application in other types of constructions differing from the types described above.

While the invention has been illustrated and described as embodiments of an electric power hybrid propulsion generation system for a motor vehicle, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An electric power hybrid propulsion generation system for a motor vehicle which comprises:
   a) a wind turbine rotatively mounted on a roof of the motor vehicle;
   b) two independent electric generators in the motor vehicle;
   c) two drive belt assemblies extending between said wind turbine and said electric generators;
   d) an auxiliary battery array in the motor vehicle electrically connected to said electric generators;
   e) an electric motor drive in the motor vehicle powered by said auxiliary battery array to operate rear wheels of the motor vehicle independently from fuel engine and transmission of the motor vehicle which operates front wheels of the motor vehicle;
   f) a vented compartment enclosing said wind turbine, said electric generators and said drive belt assemblies when the motor vehicle is a truck/tandem truck; and
   g) a wind diverter cover slideably mounted on said vented compartment in front of said wind turbine, whereby said wind diverter cover can slide between an opened position to expose said wind turbine for use and to a closed position when said wind turbine is not being used.

2. The generation system as recited in claim 1, wherein said wind turbine is comprised of a squirrel cage rotor.

3. The generation systems as recited in claim 2, wherein said squirrel cage rotor comprises a plurality of angular curved blades thereabout.

4. The generation system as recited in claim 2, wherein said squirrel cage rotor comprises a plurality of flat blades thereabout.

5. The generation system as recited in claim 1, further comprising solar panels mounted on the motor vehicle which supplies additional electric power to the motor vehicle electronics that are in turn electrically connected to said battery array.

6. The generation system as recited in claim 1, further comprising a dynamic braking circuit electrically connected to said auxiliary battery array that supplies additional electric power to said auxiliary battery array when said dynamic braking circuit is activated, by a driver of the motor vehicle applying the brakes.

\* \* \* \* \*